(12) United States Patent
Liu et al.

(10) Patent No.: US 11,500,947 B2
(45) Date of Patent: Nov. 15, 2022

(54) SEARCH METHOD AND APPARATUS

(71) Applicant: BAIDU ONLINE NETWORK TECHNOLOGY (BEIJING) CO., LTD., Beijing (CN)

(72) Inventors: Wei Liu, Beijing (CN); Anzhan Zhang, Beijing (CN); Qian Zhang, Beijing (CN); Jingying Qu, Beijing (CN); Zhengliang Chen, Beijing (CN); Chang Liu, Beijing (CN); Guoliang Chen, Beijing (CN); Gang Wang, Beijing (CN); Boxuan Zhao, Beijing (CN)

(73) Assignee: BAIDU ONLINE NETWORK TECHNOLOGY (BEIJING) CO., LTD.

( * ) Notice: Subject to any disclaimer, the term of this patent is extended or adjusted under 35 U.S.C. 154(b) by 0 days.

(21) Appl. No.: 17/207,899

(22) Filed: Mar. 22, 2021

(65) Prior Publication Data
US 2021/0209178 A1 Jul. 8, 2021

Related U.S. Application Data

(63) Continuation of application No. PCT/CN2020/107418, filed on Aug. 6, 2020.

(30) Foreign Application Priority Data

Mar. 23, 2020 (CN) .......................... 202010205983.8

(51) Int. Cl.
*G06F 16/951* (2019.01)
*G06F 16/9538* (2019.01)
(Continued)

(52) U.S. Cl.
CPC ........ *G06F 16/951* (2019.01); *G06F 16/9532* (2019.01); *G06F 16/9535* (2019.01); *G06F 16/9538* (2019.01)

(58) Field of Classification Search
CPC ............... G06F 16/951; G06F 16/9532; G06F 16/9535; G06F 16/9538
(Continued)

(56) References Cited

U.S. PATENT DOCUMENTS 8,473,473 B2 * 6/2013 Wang .................... G06F 16/951
707/705
2007/0208724 A1 9/2007 Madhavan et al.
(Continued)

FOREIGN PATENT DOCUMENTS

CN 103927342 A 7/2014
CN 104778278 A 7/2015
(Continued)

OTHER PUBLICATIONS

International Search Report in PCT/CN2020/107418 dated Dec. 21, 2020.
(Continued)

*Primary Examiner* — Mark E Hershley
(74) *Attorney, Agent, or Firm* — Dilworth IP, LLC (57) ABSTRACT

The present application discloses a search method and apparatus, which include specifically: after a search keyword is acquired, acquiring a search result of the search keyword with use of a fine ranking layer of a vertical search architecture if the search keyword is a keyword related to vertical search; processing a display effect of the search result with use of a business layer of the vertical search architecture to obtain a target search result; and transmitting the target search result to a display device. That is, in embodiments of the present application, a search result of a
(Continued)

search keyword may be acquired with use of a fine ranking layer of a vertical search architecture, and 10 orders of magnitude of data can generally be searched at the fine ranking layer compared with a business layer, therefore, a more complete and accurate search result can be obtained.

16 Claims, 5 Drawing Sheets

(51) Int. Cl.
  *G06F 16/9532* (2019.01)
  *G06F 16/9535* (2019.01)
(58) Field of Classification Search
  USPC .......................................................... 707/706
  See application file for complete search history.

(56) References Cited

U.S. PATENT DOCUMENTS

| | | | |
|---|---|---|---|
| 2010/0094878 A1* | 4/2010 | Soroca | G06F 16/9577 707/812 |
| 2011/0072045 A1* | 3/2011 | Drake | G06F 16/951 707/E17.014 |
| 2011/0258049 A1* | 10/2011 | Ramer | G06Q 30/0273 705/14.69 |
| 2014/0079297 A1* | 3/2014 | Tadayon | G06V 40/172 382/118 |
| 2014/0201126 A1* | 7/2014 | Zadeh | A61B 5/165 706/52 |
| 2017/0308583 A1* | 10/2017 | Husain | G06F 16/9024 |
| 2018/0204111 A1* | 7/2018 | Zadeh | G06N 3/0436 |
| 2020/0184278 A1* | 6/2020 | Zadeh | G06K 9/6264 |
| 2020/0410011 A1 | 12/2020 | Shi et al. | |

FOREIGN PATENT DOCUMENTS

| | | |
|---|---|---|
| CN | 104899268 A | 9/2015 |
| CN | 107092639 A | 8/2017 |
| CN | 107526846 A | 12/2017 |
| CN | 111368153 A | 7/2020 |

OTHER PUBLICATIONS

European Search Report in EP Patent Application No. 20862010.4 dated Dec. 9, 2021.
First Office Action in JP Patent Application No. 2021-517834 dated Jun. 29, 2022.

* cited by examiner

SEARCH METHOD AND APPARATUS

CROSS-REFERENCE TO RELATED APPLICATIONS

The present application is a continuation of International Application No. PCT/CN2020/107418, filed on Aug. 6, 2020, which claims priority to Chinese Patent Application No. 2020102059838, filed on Mar. 23, 2020, entitled "SEARCH METHOD AND APPARATUS", which are incorporated herein by reference in their entireties.

TECHNICAL FIELD

The present application relates to the field of intelligent search technology for data processing and, in particular, to a search method and apparatus.

BACKGROUND

Vertical search is a professional search for a certain industry, for example, a certain type of specialized information in a webpage library is integrated, and desirable data is obtained through a directional field-wise extraction for processing and then returned to users in some form. Compared with a general search engine with large amount of information, inaccurate queries, insufficient depth, etc., the vertical search achieves a more accurate and efficient search through valuable information and related services provided for a specific field, a specific group of people or a specific demand.

In the prior art, with respect of the vertical search for processing, multiple different retrieval requests are generally initiated based on a search term. The requirements involved in the retrieval requests may include, for example, operational requirements, relevance requirements, or generalization requirements. For the different retrieval requests, results are summarized as a final result.

However, in the prior art, the results derived from the vertical search are fewer and less precise.

SUMMARY

Embodiments of the present application provide a search method and apparatus for solving the technical problem in the prior art that the results derived from the vertical search are fewer and less precise.

In a first aspect, an embodiment of the present application provides a search method including:

acquiring a search keyword; acquiring a search result of the search keyword with use of a fine ranking layer of a vertical search architecture under a circumstance that the search keyword is a keyword related to vertical search; processing a display effect of the search result with use of a business layer of the vertical search architecture to obtain a target search result; and transmitting the target search result to a display device. That is, in the embodiments of the present application, a search result of a search keyword may be acquired with use of a fine ranking layer of a vertical search architecture, and 10 orders of magnitude of data can generally be searched at the fine ranking layer compared with a business layer, therefore, a more complete and accurate search result can be obtained.

In a possible implementation, the acquiring the search result of the search keyword with use of the fine ranking layer of the vertical search architecture includes: obtaining multiple retrieval requests with use of the search keyword at the fine ranking layer; generating, for each retrieval request, a queue to calculate the retrieval request, and obtaining a search result of the retrieval request; and combining search results of the multiple retrieval requests to obtain the search result of the search keyword. In this way, a queue is used for calculation for any retrieval request, which may improve retrieval efficiency.

In a possible implementation, the obtaining the multiple retrieval requests with use of the search keyword includes: adding multiple different preset fields respectively to the search keyword to obtain the multiple retrieval requests.

In a possible implementation, the obtaining the multiple retrieval requests with use of the search keyword includes: modifying a field of the search keyword for multiple times according to a preset modification rule to obtain the multiple retrieval requests.

In a possible implementation, multiple queues corresponding to the multiple retrieval requests are distributed in a tree structure. Various vertical businesses can be applied in search scenarios at low costs through a tree-like queue representation and a flexible and optional fine ranking scheme, which is versatile and is better in efficiency than the existing scheme.

In a possible implementation, the combining the search results of the multiple retrieval requests includes: combining the search results obtained through calculation from the respective queues layer-wise according to a sequence of the tree structure.

In a possible implementation, the combining the search results of the multiple retrieval requests includes: combining the search results calculated from the respective queues according to priorities of the multiple queues corresponding to the multiple retrieval requests.

In a possible implementation, the processing the display effect of the search result with use of the business layer of the vertical search architecture to obtain the target search result includes: adjusting a font in the search result and/or a dimension of an image in the search result with use of the business layer of the vertical search architecture to obtain the target search result. In this way, a better display effect may be obtained and user experience may be improved.

In a second aspect, an embodiment of the present application provides a search apparatus including:

a processing module, configured to acquire a search keyword;

where the processing module is further configured to acquire a search result of the search keyword with use of a fine ranking layer of a vertical search architecture under a circumstance that the search keyword is a keyword related to vertical search;

the processing module is further configured to process a display effect of the search result with use of a business layer of the vertical search architecture to obtain a target search result; and a transmitting module, configured to transmit the target search result to a display device.

In a possible implementation, the processing module is specifically configured to:

obtain multiple retrieval requests with use of the search keyword at the fine ranking layer;

generate, for each retrieval request, a queue to calculate the retrieval request, and obtain a search result of the retrieval request; and combine search results of the multiple retrieval requests to obtain the search result of the search keyword.

In a possible implementation, the processing module is specifically further configured to:

add multiple different preset fields respectively to the search keyword to obtain the multiple retrieval requests.

In a possible implementation, the processing module is specifically further configured to:

modify a field of the search keyword for multiple times according to a preset modification rule to obtain the multiple retrieval requests.

In a possible implementation, multiple queues corresponding to the multiple retrieval requests are distributed in a tree structure.

In a possible implementation, the processing module is specifically further configured to:

combine the search results obtained through calculation from the respective queues layer-wise according to a sequence of the tree structure.

In a possible implementation, the processing module is specifically further configured to:

combine the search results calculated from the respective queues according to priorities of the multiple queues corresponding to the multiple retrieval requests.

In a possible implementation, the processing module is specifically further configured to:

adjust a font in the search result and/or a dimension of an image in the search result with use of the business layer of the vertical search architecture to obtain the target search result.

In a third aspect, an embodiment of the present application provides an electronic device including: at least one processor; and a memory communicatively connected to the at least one processor; where the memory is stored with instructions executable by the at least one processor, and the instructions are executed by the at least one processor to enable the at least one processor to execute the method according to any item of the first aspect described above.

In a fourth aspect, an embodiment of the present application provides a non-transitory computer readable storage medium stored with computer instructions for enabling a computer to execute the method according to any item of the first aspect described above.

In summary, the embodiments of the present application have the following beneficial effects over the prior art.

In embodiments of the present application, a search method and apparatus are provided. It was found in the prior art that multiple different requests are initiated at the business layer and then integrated, for each request at the business layer, since fewer results are returned to the business layer, which results in a large number of valuable content being discarded and the final integrated result being fewer and less precise. Therefore, the embodiments of the present application allows for: after a search keyword is acquired, acquiring a search result of the search keyword with use of a fine ranking layer of a vertical search architecture if the search keyword is a keyword related to vertical search; processing a display effect of the search result with use of a business layer of the vertical search architecture to obtain a target search result; and transmitting the target search result to a display device. That is, in embodiments of the present application, a search result of a search keyword may be acquired with use of a fine ranking layer of a vertical search architecture, and 10 orders of magnitude of data can generally be searched at the fine ranking layer compared with a business layer, therefore, a more complete and accurate search result can be obtained.

It should be understood that the content described in this section is not intended to identify a key or important feature in an embodiment of present disclosure, nor is it intended to limit the scope of the present disclosure. Other features of the present disclosure will become readily comprehensible with the following description.

BRIEF DESCRIPTION OF DRAWINGS

The accompanying drawings are used to better understand the present solution, but do not constitute a limitation to the present application. Among them.

DESCRIPTION OF EMBODIMENTS

Exemplary embodiments of the present application will be described hereunder with reference to the accompanying drawings, which include therein various details of the embodiments of the present application to facilitate understanding and should be considered as to be merely exemplary. Therefore, those of ordinary skill in the art should realize that various changes and modifications can be made to the embodiments described herein without departing from the scope and spirit of the present application. Likewise, for clarity and conciseness, descriptions of well-known functions and structures are omitted in the following description. The following embodiments and features therein can be combined with each other without conflict.

The method in the embodiments of the present application can be applied to a terminal device or a server, where the terminal device may include electronic devices such as a mobile phone, a tablet computer, a notebook computer, or a desktop computer. A specific device that is applied is not specifically limited in the embodiments of the present application.

Exemplarily, a graphical user interface (GUI) may be provided in the terminal or the server, and controls and input boxes for receiving user operations may be provided in the graphical user interface so that a user may input a search keyword in the graphical user interface, thereby implementing the search method in the embodiment of the present application. It will appreciate that specific content of the graphical user interface may be determined according to an actual application scenario, which is not specifically limited in the embodiment of the present disclosure.

It is found in the embodiments of the present application that, generally, in a vertical search architecture, multiple different requests are initiated at a business layer, and multiple search results are acquired according to data information at the business layer and then integrated to obtain a final displayed search result.

Exemplarily, after a user inputs a search term about a disease, the user may expect to search for information in terms of disease introduction, medicine, doctor, hospital, hospital registration and the like, while data corresponding thereto generally belongs to data sources of different places. At the business layer, it is necessary to transmit requests to the data sources of different places, and then a certain number of search results will be selected from search results acquired in each data source for integration, resulting in a possibility during the selection that a large number of valuable content will be discarded, data information at the business layer in the search architecture is generally less, for each request at the business layer, fewer results are returned to the business layer, and the final integrated result is less precise, so that user needs cannot be better met.

On the basis of this, an embodiment of the present application provides a vertical search architecture, where the vertical search architecture may include: a business layer, a fine ranking layer, etc. A search result of a search keyword may be acquired with use of the fine ranking layer of the vertical search architecture, and the volume of data information at the fine ranking layer is greater than that at the business layer, for example, 10 orders of magnitude of data can generally be searched at the fine ranking layer compared with the business layer, therefore, a more complete and accurate search result can be obtained.

Figure 1:
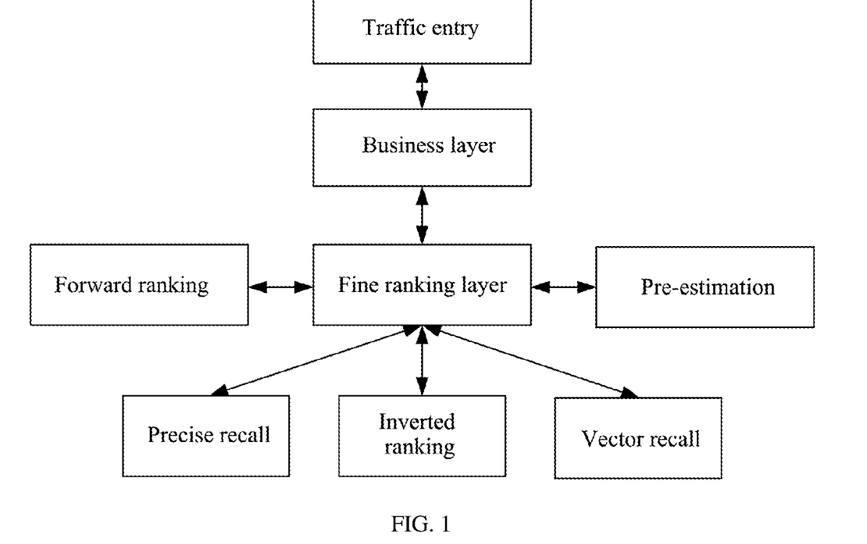
FIG. 1 is a schematic diagram of a vertical search architecture according to an embodiment of the present application.

Exemplarily, FIG. 1 shows a schematic diagram of a vertical search architecture according to an embodiment of the present application.

The traffic entry may be used to input a search keyword.

The fine ranking layer may be used to recall multiple search results of the search keyword and to rank the recalled search results.

For example, the fine ranking layer can be used to achieve the following functions. Precise recall: for example, given a specific search keyword (query), return a specific group of result sets, generally operating data, personalized mining data, etc. Inverted ranking: a scenario recall approach in which terms in a request are used to recall, for example. Vector recall: a semantic recall approach in which the request is converted into a vector and recalled back by means of a model, for example. Pre-estimation: an important ranking signal, for example, a model trained according to user clicks, used for a fine ranking strategy. Forward ranking: which achieves storage of other information used at the fine ranking layer.

The business layer can be used to perform display-level operations such as aggregation and modification on results returned by the fine ranking layer, and generally there is no change to the relative order of the results returned by the fine ranking layer. For example, at the business layer, the logic ranked by the fine ranking layer is performed with a business strategy, such as display style selection and field expansion.

In a possible implementation, the vertical search architecture in the embodiments of the present application may also include a coarse ranking layer. The coarse ranking layer may be an uppermost layer of the vertical search architecture, which can be used to quickly filter a candidate set with an algorithm having a relatively good performance. Generally, results at a level of 1,000 are filtered out of a set at a level higher than 10,000 and input to the fine ranking layer. Adaptably, at the fine ranking layer, a ranking algorithm can be used to filter, from coarse ranking results, results that are most relevant to the search keyword input by the user, and a general scale is to filter out a level of 100 from a level of 1,000.

Figure 2:
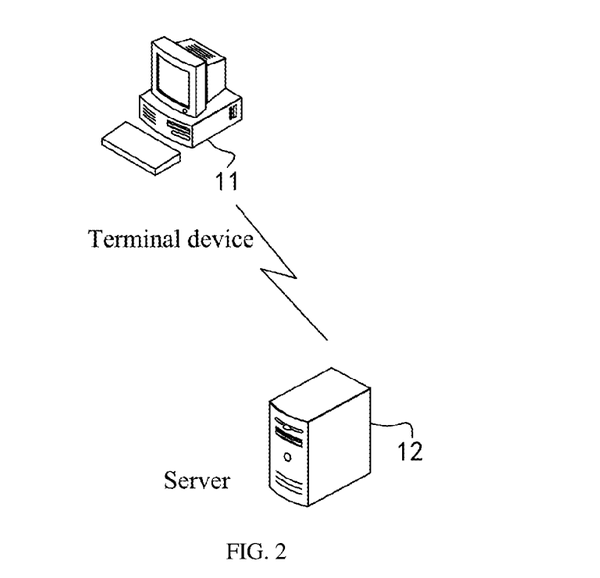
FIG. 2 is a schematic diagram of a system architecture to which a search method according to an embodiment of the present application is applicable.

As shown in FIG. 2, FIG. 2 is a schematic diagram of an application scenario architecture to which a method according to an embodiment of the present application is applicable.

In a possible implementation, the search method in the embodiment of the present application may be implemented based on an interaction between a terminal device 11 and a server 12. For example, a user may input a search keyword in the terminal device 11; the terminal device 11 may then acquire the search keyword; the terminal device 11 may generate a search request containing the search keyword and transmit the search request containing the search keyword to the server 12; the server 12 may acquire the search keyword; the server 12 may determine whether the search keyword is a keyword related to vertical search, and if the search keyword is a keyword related to vertical search, a search result of the search keyword may be acquired with use of a fine ranking layer of a vertical search architecture provided in the server; and a display effect of the search result may be processed with use of a business layer of the vertical search architecture to obtain a target search result; and then the target search result is transmitted to a display device (such as the terminal device 11). Thus, the target search result may be displayed in the terminal device 11. It will appreciate that, in a specific application, the number of servers may be any value greater than or equal to 1, which is not specifically limited in the embodiment of the present application.

In a possible implementation, the vertical search architecture may be provided in the terminal device 11, and the terminal device may then implement the search method in the embodiment of the present application. For example, a user may input a search keyword in the terminal device 11; the terminal device 11 may then acquire the search keyword; the terminal device 11 may determine whether the search keyword is a keyword related to vertical search, and if the search keyword is a keyword related to vertical search, a search result of the search keyword may be acquired with use of a fine ranking layer of a vertical search architecture; and a display effect of the search result may be processed with use of a business layer of the vertical search architecture to obtain a target search result; and then the target search result is transmitted to a display device (such as a display device of the terminal device 11). Thus, the target search result may be displayed in the display device of the terminal device 11.

It will appreciate that the search method in the embodiment of the present application may also be applied to other scenarios, which is not specifically limited in the embodiment of the present application. Moreover, regardless of the application scenario, since the search result of the search keyword is acquired with use of the fine ranking layer of the vertical search architecture, 10 orders of magnitude of data can generally be searched at the fine ranking layer compared with the business layer, therefore, a more complete and accurate search result can be obtained.

Figure 3:
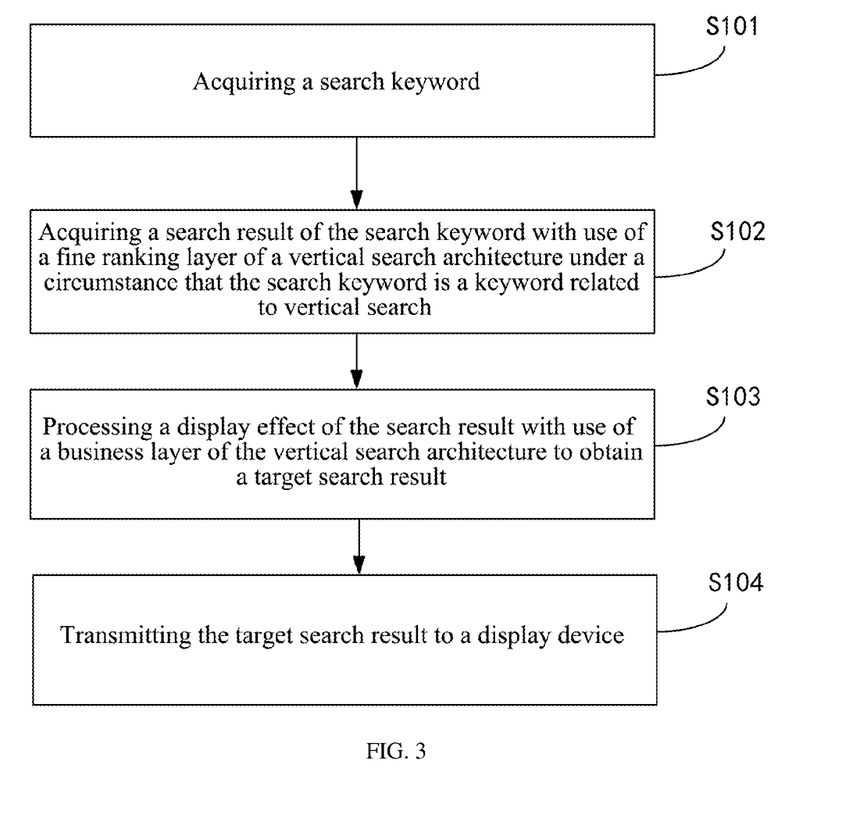
FIG. 3 is a schematic flowchart of a search method according to an embodiment of the present application.

As shown in FIG. 3, FIG. 3 is a schematic flowchart of a search method according to an embodiment of the present application. The method may specifically include:

S101, acquiring a search keyword.

In the embodiment of the present application, the search keyword may be any content input by a user. Exemplarily, the user may input the search keyword in an input box, or use a voice control to vocally input the search keyword, or the like, then the search keyword may be acquired.

S102, acquiring a search result of the search keyword with use of a fine ranking layer of a vertical search architecture under a circumstance that the search keyword is a keyword related to vertical search.

In a possible implementation of the embodiment of the present application, the keyword related to vertical search may be pre-stored in a storage location such as a database. After the search keyword is acquired, a query may be made in the storage location such as the database with regard to whether the search keyword is contained, if the search keyword is contained in the storage location such as the database, it may be determined that the search term is a keyword related to vertical search. If the search keyword is not contained in the storage location such as the database, it may be determined that the search term is not a keyword related to vertical search.

Exemplarily, the keyword related to vertical search may be a keyword related to medical treatment, novels, pictures, etc. The keyword related to vertical search is not specifically limited in the embodiment of the present application.

In an embodiment of the present application, the user may be unaware of the process of determining whether the search term is a keyword related to vertical search, that is, when inputting the search keyword, the user may not need to pay attention to either normal search or vertical search is particularly used. The user inputs the search keyword according to actual needs, and then an execution subject who executes the method in the embodiment of the present application may automatically determine whether the search keyword input by the user is a keyword related to vertical search, and execute a subsequent step.

In an embodiment of the present application, a fine ranking layer of a vertical search architecture may be used to acquire a search result of the search keyword in any manner. For example, multiple search results of the search keyword may be recalled at the fine ranking layer, and the recalled search results may be ranked, where multiple top-ranked search results may be used as search results of the search keyword, and this is not specifically limited in the embodiment of the present application.

S103, processing a display effect of the search result with use of a business layer of the vertical search architecture to obtain a target search result.

In the embodiment of the present application, after the search result of the search keyword is acquired at the fine ranking layer, the search result of the search keyword may be transmitted to the business layer, and the business layer may process a display effect of the search result, for example, a result returned from the fine ranking layer may be performed with a display-level operation such as display style selection as well as field expansion and modification, and a target search result is obtained.

S104, transmitting the target search result to a display device.

In a possible implementation, the execution subject of S101-S103 is a server; then in S104, the display device may be the terminal device where the user inputs the search keyword; the server may transmit the target search result to the terminal device; and thus the terminal device may display the target search result.

In a possible implementation, the execution subject of S101-S103 is the terminal device where the user inputs the search keyword; then in S104, the display device may be a display screen of the terminal device, or the like; the terminal device may transmit the target search result to the display device; and the display device may display the target search result.

In summary, a search method and apparatus are provided in embodiments of the present application. It was found in the prior art that multiple different requests are initiated at the business layer and then integrated, for each request at the business layer, since fewer results are returned to the business layer, which results in a large number of valuable content being discarded and the final integrated result being fewer and less precise. Therefore, the embodiments of the present application allows for: after a search keyword is acquired, acquiring a search result of the search keyword with use of a fine ranking layer of a vertical search architecture if the search keyword is a keyword related to vertical search; processing a display effect of the search result with use of a business layer of the vertical search architecture to obtain a target search result; and transmitting the target search result to a display device. That is, in embodiments of the present application, a search result of a search keyword may be acquired with use of a fine ranking layer of a vertical search architecture, and 10 orders of magnitude of data can generally be searched at the fine ranking layer compared with a business layer, therefore, a more complete and accurate search result can be obtained.

On the basis of the embodiment corresponding to FIG. 3, in a possible implementation, the acquiring the search result of the search keyword with use of the fine ranking layer of the vertical search architecture includes: obtaining multiple retrieval requests with use of the search keyword at the fine ranking layer; generating, for each retrieval request, a queue to calculate the retrieval request, and obtaining a search result of the retrieval request; and combining search results of the multiple retrieval requests to obtain the search result of the search keyword.

In an embodiment of the present application, at the fine ranking layer, the search keyword may be processed according to a business scenario to obtain multiple retrieval requests, and then for each retrieval request, a queue is generated to obtain, from calculation, a retrieval result of the retrieval request, and search results of multiple retrieval requests are combined to obtain the search result of the search keyword.

Figure 4:
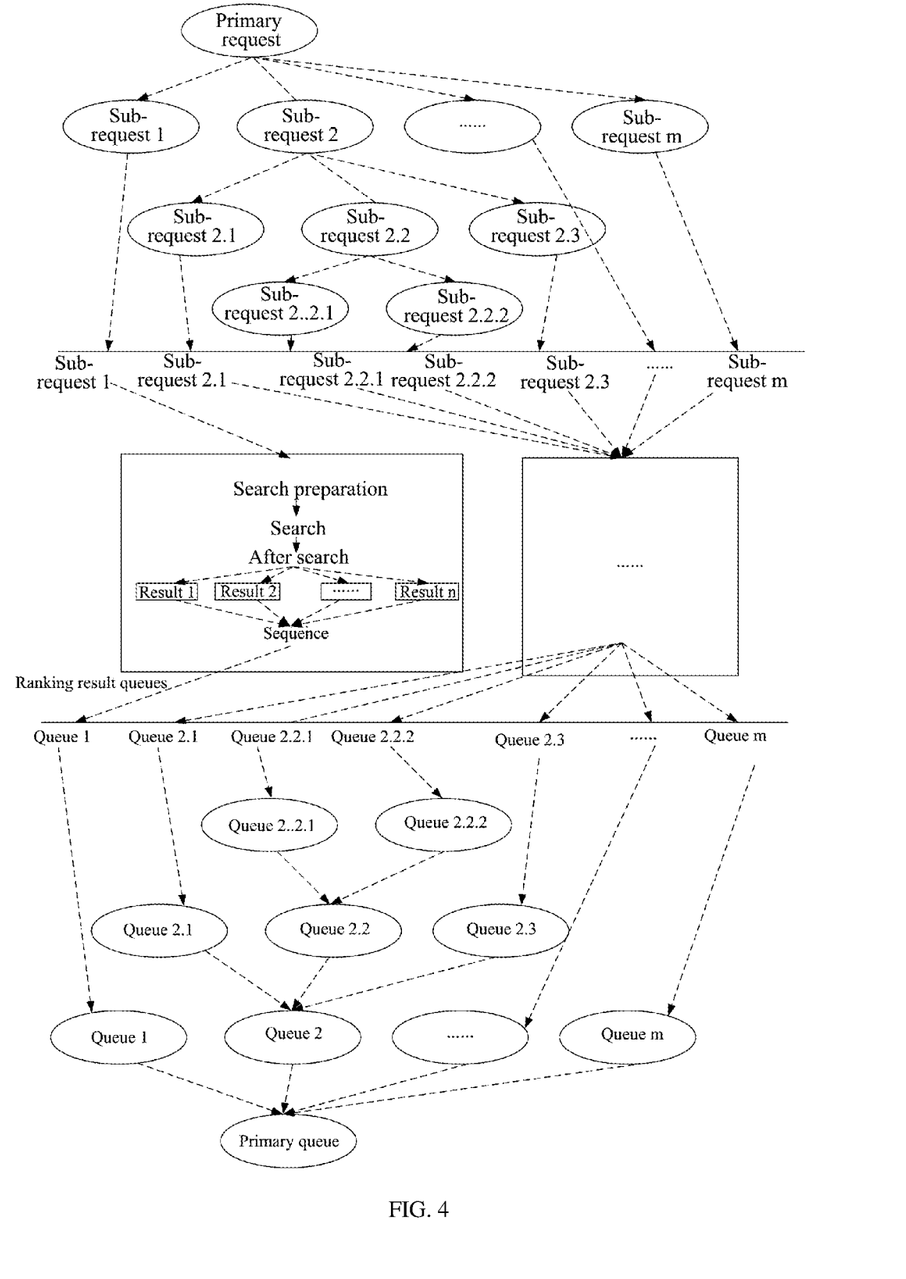
FIG. 4 is a schematic diagram of a retrieval request calculation with use of a queue according to an embodiment of the present application.

Exemplarily, FIG. 4 shows a schematic diagram of a retrieval request calculation with use of multiple queues at the fine ranking layer. Among them, a primary request may be a request that contains the search keyword. The primary request may be flexibly split into multiple sub-requests. In splitting, each sub-request may also be further split into more detailed sub-requests. For each split sub-request, a queue is accordingly generated for separate calculation, and then calculation results of the respective queues may be combined to obtain the search result of the search keyword.

In a possible implementation, the obtaining the multiple retrieval requests with use of the search keyword at the fine ranking layer may be: adding multiple different preset fields respectively to the search keyword to obtain the multiple retrieval requests. For example, if a user inputs a search keyword "cold", fields may be added respectively to the "cold" to obtain "cold medicine", "cold registration", "cold diet", or the like, thereby obtaining retrieval requests under multiple different subcategories.

Alternatively, exemplarily, the obtaining the multiple retrieval requests with use of the search keyword at the fine ranking layer may be: modifying a field of the search keyword for multiple times according to a preset modification rule to obtain the multiple retrieval requests. The preset modification rule may be to replace an invalid word in the search keyword with a keyword under a different subcategory. For example, if a user inputs search keywords "what to do if catch cold", an invalid word "what to do if" among "what to do if catch cold" may be modified for multiple times to obtain "cold medicine", "cold registration", "cold diet", or the like, thereby obtaining multiple retrieval requests under different subcategories.

In a possible implementation, multiple queues corresponding to the multiple retrieval requests are distributed in a tree structure.

Figure 5:
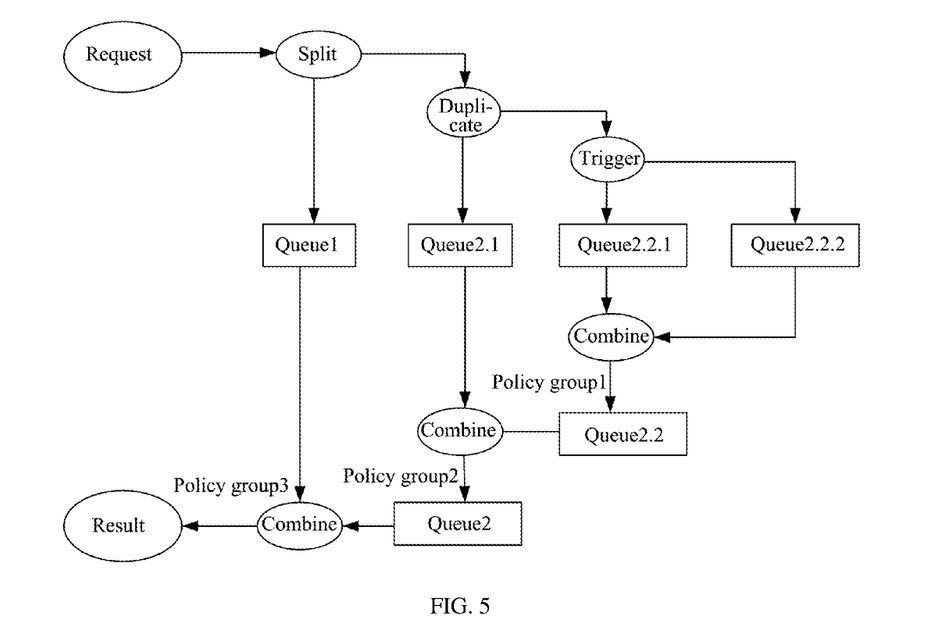
FIG. 5 is a schematic diagram of a work flow of a tree-like multi-queue according to an embodiment of the present application.

Exemplarily, FIG. 5 shows a schematic diagram of a work flow of a tree-like multi-queue. A retrieval request may be flexibly split into a tree-like queue.

For example, each piece of multi-queue information may be written into a specified field, and a specified field of each queue may be added to the search keyword at the fine ranking layer to generate a retrieval request for each queue. For example, a new retrieval request may be constructed by modifying the specified request field upon duplication of the search keyword. For example, a new retrieval request may also be constructed by requesting a bypass service at the fine ranking layer to generate request information initiatively. The methods for generating the retrieval requests described above may also be used in cross-integration, and multiple layers of sub-queues may be flexibly generated under various demand scenarios.

For each queue, a separate calculation may be made, and then calculation results of respective queues may be gradually combined to obtain a final result.

For example, when combining the calculation results of the queues, they may be combined layer-wise according to a sequence of the tree structure generated by the queues. For example, when combining the calculation results of the queues, results of high priority queues may be preferentially combined according to priorities of the queues (the priority of each queue may be determined according to an actual application scenario, which is not specifically limited in the embodiment of the present application). For example, when combining the calculation results of the queues, a queue filtering condition may also be set, e.g., a selection/discard condition for each sub-queue is set.

After the results of the multiple queues are combined back into a primary queue, operations such as re-ranking, breaking-up, filtering, and deduplication for the combined results may be performed on the primary queue.

Taking a user's search for "what to do if catch cold" as an example, the query "what to do if catch cold" will be issued at the business layer, and a business-defined queue-splitting method will be called at a framework of the fine ranking layer to split out retrieval requests under different subcategories, such as "cold medicine", "cold registration", "cold diet" and other retrieval requests. These retrieval requests are issued by respective sub-queues in parallel to the coarse ranking layer for recalling and coarse ranking. Each sub-queue's returned result from coarse ranking may be customized for fine ranking, such as the sub-queue "cold registration", the returned medical information may be performed with comprehensive ranking in terms of a free combination with combining factors such as hospital grade, patient score, and visiting distance. After a sub-queue's fine ranking finishes, it will be aggregated with other related sub-queues according to other configured rules. For example, the "medicine" results and the "diet' results appear alternately, the fine ranking layer returns to the business layer a collection integrating ranked subcategories. Furthermore, it is possible to adjust a font in the search result returned by the fine ranking layer and/or a dimension of an image in the search result returned by the fine ranking layer with use of the business layer of the vertical search architecture to obtain the target search result.

In summary, according to the embodiments of the present application, multiple requests may be triggered at the fine ranking layer according to a business scenario, where the multiple requests are represented in a form of a tree diagram at any level. For each queue, a separate fine ranking calculation may be performed, and then the entire tree-like request queues are combined to return a final result. On one hand, through calculation on the search result at the fine ranking layer, more signals and data may be obtained (generally, 10 orders of magnitude of data may be obtained compared to the business layer), in practice, the tree queue can support a variety of fine ranking algorithms (such as rule-based text similarity algorithm, compactness algorithm, BM25 algorithm, and statistics-based click-through rate pre-estimation model algorithm, etc.), which is dramatically better in terms of effect than the integration of different requests at the business layer. On the other hand, various vertical businesses can be applied in search scenarios at low costs through a tree-like queue representation and a flexible and optional fine ranking scheme, which is versatile and is better in efficiency than the existing scheme.

Figure 6:
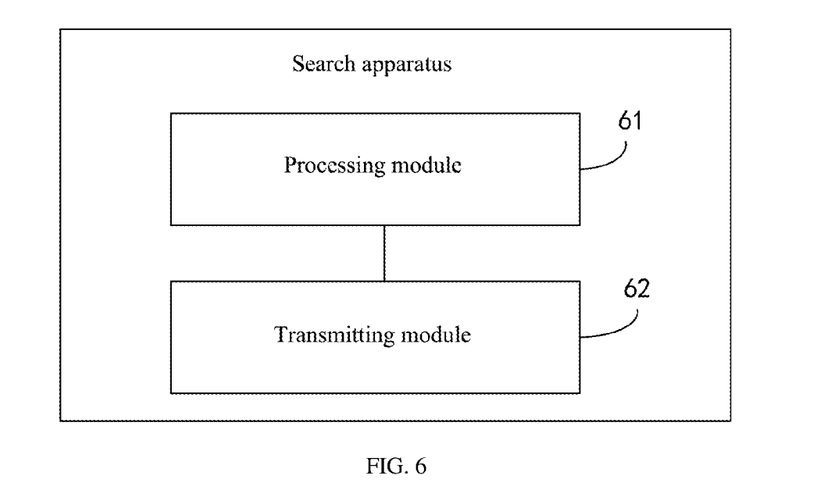
FIG. 6 is a schematic structural diagram of a search apparatus according to an embodiment of the present application.

FIG. 6 is a schematic structural diagram of an embodiment of a search apparatus provided in the present application. As shown in FIG. 6, the search apparatus provided in this embodiment include:

a processing module 61, configured to acquire a search keyword;

where the processing module 61 is further configured to acquire a search result of the search keyword with use of a fine ranking layer of a vertical search architecture under a circumstance that the search keyword is a keyword related to vertical search;

the processing module 61 is further configured to process a display effect of the search result with use of a business layer of the vertical search architecture to obtain a target search result; and a transmitting module 62, configured to transmit the target search result to a display device.

In a possible implementation, the processing module is specifically configured to:

obtain multiple retrieval requests with use of the search keyword at the fine ranking layer;

generate, for each retrieval request, a queue to calculate the retrieval request, and obtain a search result of the retrieval request; and combine search results of the multiple retrieval requests to obtain the search result of the search keyword.

In a possible implementation, the processing module is specifically further configured to:

add multiple different preset fields respectively to the search keyword to obtain the multiple retrieval requests.

In a possible implementation, the processing module is specifically further configured to:

modify a field of the search keyword for multiple times according to a preset modification rule to obtain the multiple retrieval requests.

In a possible implementation, multiple queues corresponding to the multiple retrieval requests are distributed in a tree structure.

In a possible implementation, the processing module is specifically further configured to:

combine the search results obtained through calculation from the respective queues layer-wise according to a sequence of the tree structure.

In a possible implementation, the processing module is specifically further configured to:

combine the search results calculated from the respective queues according to priorities of the multiple queues corresponding to the multiple retrieval requests.

In a possible implementation, the processing module is specifically further configured to:

adjust a font in the search result and/or a dimension of an image in the search result with use of the business layer of the vertical search architecture to obtain the target search result.

In embodiments of the present application, a search method and apparatus are provided. It was found in the prior art that multiple different requests are initiated at the business layer and then integrated, for each request at the business layer, since fewer results are returned to the business layer, which results in a large number of valuable content being discarded and the final integrated result being fewer and less precise. Therefore, the embodiments of the present application allows for: after a search keyword is acquired, acquiring a search result of the search keyword with use of a fine ranking layer of a vertical search architecture if the search keyword is a keyword related to vertical search; processing a display effect of the search result with use of a business layer of the vertical search architecture to obtain a target search result; and transmitting the target search result to a display device. That is, in embodiments of the present application, a search result of a search keyword may be acquired with use of a fine ranking layer of a vertical search architecture, and 10 orders of magnitude of data can generally be searched at the fine ranking layer compared with a business layer, therefore, a more complete and accurate search result can be obtained.

The search apparatus provided in each embodiment of the present application can be used to execute the method shown in each corresponding embodiment described above; implementations and principles therebetween are the same, and details will not be described here again.

According to embodiments of the present application, the present application also provides an electronic device and a readable storage medium.

Figure 7:
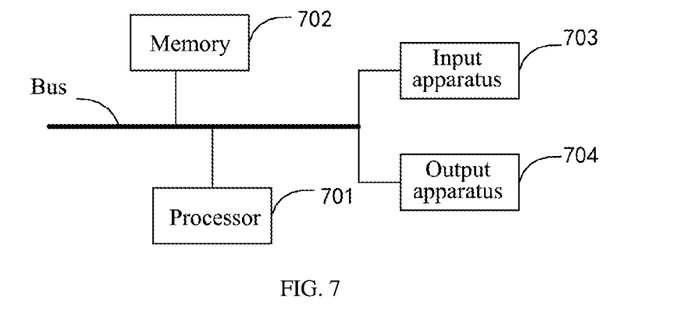
FIG. 7 is a block diagram of an electronic device for implementing a search method according to an embodiment of the present application.

FIG. 7 is a block diagram of an electronic device for a search method according to an embodiment of the present application. The electronic device is intended to represent various forms of digital computers, such as a laptop computer, a desktop computer, a workbench, a personal digital assistant, a server, a blade server, a mainframe computer, and other suitable computers. The electronic device may also represent various forms of mobile apparatuses, such as a personal digital assistant, a cellular phone, a smart phone, a wearable device, and other similar computing apparatuses. The components shown herein, their connections and relationships, and their functions are merely as examples, and are not intended to limit implementations in the present application described and/or claimed herein.

As shown in FIG. 7, the electronic device includes: one or more processors 701, a memory 702, and an interface for connecting various components, including a high-speed interface and a low-speed interface. The various components are connected to each other via different buses, and can be installed on a public motherboard or installed in other ways as desired. The processor may process instructions executed within the electronic device, including instructions that stored in or on the memory to display GUI graphical information on an external input/output apparatus (such as a display device coupled to the interface). In other embodiments, multiple processors and/or multiple buses can be used together with multiple memories, if desired. Similarly, multiple electronic devices can be connected, and each device provides some necessary operations (for example, as a server array, a group of blade servers, or a multi-processor system). In FIG. 7, one processor 701 is used as an example.

The memory 702 is a non-transitory computer readable storage medium provided in the present application. Among them, the memory is stored with instructions executable by at least one processor, enabling the at least one processor to execute the search method provided in the present application. The non-transitory computer readable storage medium of the present application is stored with computer instructions, which are configured to enable a computer to execute the search method provided in the present application.

As a kind of non-transitory computer readable storage medium, the memory 702 may be configured to store non-transitory software programs, non-transitory computer executable programs and modules, such as program instructions/modules (such as the processing module 61 and the transmitting module 62 as shown in FIG. 6) corresponding to the search method in the embodiments of the present application. The processor 701 executes various functional applications and data processing of the server by running the non-transitory software programs, instructions, and modules stored in the memory 702, thereby achieving the search method in the above method embodiments.

The memory 702 may include a program storage area and a data storage area, where the program storage area may be stored with an operating system and an application program required by at least one function, the data storage area may be stored with data created according to use of the electronic device for the search method, and so on. In addition, the memory 702 may include a high-speed random access memory, and may also include a non-transitory memory, such as at least one magnetic disk storage device, a flash memory device, or other non-transitory solid-state storage devices. In some embodiments, the memory 702 optionally includes memories remotely arranged relative to the processor 701, and these remote memories can be connected to the electronic device for the search method through a network. Examples of the above network include, but are not limited to, Internet, an intranet, a local area network, a mobile communication network, and a combination thereof.

The electronic device for the search method may also include: an input apparatus 703 and an output apparatus 704. The processor 701, the memory 702, the input apparatus 703 and the output apparatus 704 can be connected by a bus or in other ways. In FIG. 7, connections via buses are used as an example.

The input apparatus 703 may receive input digital or character information, and generate key signal input related to user settings and function control of the electronic device for the search method, such as a touch screen, a keypad, a mouse, a trackpad, a touchpad, an indicator bar, one or more mouse buttons, a trackball, a joystick and other input apparatuses. The output apparatus 704 may include a display device, an auxiliary lighting apparatus (e.g., an LED), a tactile feedback apparatus (e.g., a vibration motor), and so on. The display device may include, but is not limited to, a liquid crystal display (LCD), a light emitting diode (LED) display, and a plasma display. In some implementations, the display device may be the touch screen.

Various implementations of the system and the technique described here may be implemented in a digital electronic circuit system, an integrated circuit system, an ASIC (application specific integrated circuit), computer hardware, firmware, software, and/or a combination thereof. These various implementations may include: implementations implemented in one or more computer programs, where the one or more computer programs may be executed and/or interpreted on a programmable system including at least one programmable processor, and the programmable processor may be a dedicated or generic programmable processor, which may receive data and instructions from a storage system, at least one input apparatus and at least one output apparatus, and transmit the data and the instructions to the storage system, the at least one input apparatus and the at least one output apparatus.

These computer programs (also known as programs, software, software applications, or codes) include machine instructions of the programmable processor, and may be implemented using a high-level process and/or an object-oriented programming language, and/or an assembly/machine language. As used herein, the terms "machine readable medium" and "computer readable medium" refer to any computer program product, device, and/or apparatus (e.g., a magnetic disk, an optical disk, a memory, a programmable logic device (PLD)) configured to provide machine instructions and/or data to the programmable processor, including a machine readable medium that receives machine instructions as machine readable signals. The term "machine readable signal" refers to any signal configured to provide machine instructions and/or data to the programmable processor.

For provision of interaction with a user, the system and the technique described herein may be implemented on a computer, and the computer has: a display apparatus for displaying information to the user (such as a CRT (cathode ray tube) or an LCD (liquid crystal display) monitor); and a keyboard and a pointing apparatus (such as a mouse or a trackball), the user may provide an input to the computer through the keyboard and the pointing apparatus. Other kinds of apparatuses may also be used to provide the interaction with the user; for example, feedback provided to the user may be any form of sensor feedback (e.g., visual feedback, auditory feedback, or tactile feedback); and may receive the input from the user in any form (including an acoustic input, a voice input, or a tactile input).

The system and the technique described herein may be implemented in a computing system that includes back-end components (for example, as a data server), or a computing system that includes intermediate components (for example, an application server), or a computing system that includes front-end components (for example, a user computer with a graphical user interface or a web browser through which the user may interact with the implementations of the systems and the techniques described herein), or a computing system that includes any combination of the back-end components, the intermediate components, or the front-end components. The components of the system may be interconnected by any form or medium of digital data communications (e.g., a communication network). Examples of the communication network include: a local area network (LAN), a wide area network (WAN), and Internet.

The computing system may include a client and a server. The client and the server are generally far away from each other, and generally interact with each other through the communication network. A relationship between the client and the server is generated by computer programs running on a corresponding computer and having a client-server relationship for each other.

According to the technical solution provided in the embodiments of the present application, it was found in the prior art that multiple different requests are initiated at the business layer and then integrated, for each request at the business layer, since fewer results are returned to the business layer, which results in a large number of valuable content being discarded and the final integrated result being fewer and less precise. Therefore, the embodiments of the present application allows for: after a search keyword is acquired, acquiring a search result of the search keyword with use of a fine ranking layer of a vertical search architecture if the search keyword is a keyword related to vertical search; processing a display effect of the search result with use of a business layer of the vertical search architecture to obtain a target search result; and transmitting the target search result to a display device. That is, in embodiments of the present application, a search result of a search keyword may be acquired with use of a fine ranking layer of a vertical search architecture, and 10 orders of magnitude of data can generally be searched at the fine ranking layer compared with a business layer, therefore, a more complete and accurate search result can be obtained.

It should be understood that the various forms of procedures shown above can be used, and reordering, addition, or deletion of the step can be performed. For example, the steps recorded in the present application can be performed concurrently, sequentially, or in different orders, provided that desirable results of the technical solutions disclosed in the present application could be achieved, and there is no limitation herein.

The above specific embodiments do not constitute a limitation on the protection scope of the present application. Those skilled in the art should understand that various modifications, combinations, sub-combinations, and replacements can be made according to design requirements and other factors. Any modification, equivalent replacement and improvement, etc., made within the spirit and principle of the present application shall be included in the protection scope of the present application.

What is claimed is:

1. A search method, comprising:
    acquiring a search keyword;
    acquiring a search result of the search keyword with use of a fine ranking layer of a vertical search architecture under a circumstance that the search keyword is a keyword related to vertical search;
    processing a display effect of the search result with use of a business layer of the vertical search architecture to obtain a target search result; and
    transmitting the target search result to a display device;
    wherein the acquiring the search result of the search keyword with use of the fine ranking layer of the vertical search architecture comprises:
    obtaining multiple retrieval requests with use of the search keyword at the fine ranking layer;
    generating, for each retrieval request, a queue to calculate the retrieval request, and obtaining a search result of the retrieval request; and
    combining search results of the multiple retrieval requests to obtain the search result of the search keyword.

2. The method according to claim 1, wherein the obtaining the multiple retrieval requests with use of the search keyword comprises:
    adding multiple different preset fields respectively to the search keyword to obtain the multiple retrieval requests.

3. The method according to claim 1, wherein the obtaining the multiple retrieval requests with use of the search keyword comprises:

modifying a field of the search keyword for multiple times according to a preset modification rule to obtain the multiple retrieval requests.

4. The method according to claim 1, wherein multiple queues corresponding to the multiple retrieval requests are distributed in a tree structure.

5. The method according to claim 4, wherein the combining the search results of the multiple retrieval requests comprises:
combining the search results obtained through calculation from the respective queues layer-wise according to a sequence of the tree structure.

6. The method according to claim 1, wherein the combining the search results of the multiple retrieval requests comprises:
combining the search results calculated from the respective queues according to priorities of the multiple queues corresponding to the multiple retrieval requests.

7. The method according to claim 1, wherein the processing the display effect of the search result with use of the business layer of the vertical search architecture to obtain the target search result comprises:
adjusting at least one of a font in the search result and a dimension of an image in the search result with use of the business layer of the vertical search architecture to obtain the target search result.

8. A search apparatus, comprising:
at least one processor; and a memory communicatively connected to the at least one processor; wherein the memory is stored with instructions executable by the at least one processor, and the instructions are executed by the at least one processor to enable the at least one processor to:
acquire a search keyword;
acquire a search result of the search keyword with use of a fine ranking layer of a vertical search architecture under a circumstance that the search keyword is a keyword related to vertical search;
process a display effect of the search result with use of a business layer of the vertical search architecture to obtain a target search result; and
control an output apparatus to transmit the target search result to a display device;
wherein the instructions are executed by the at least one processor to enable the at least one processor to:
obtain multiple retrieval requests with use of the search keyword at the fine ranking layer;
generate, for each retrieval request, a queue to calculate the retrieval request, and obtain a search result of the retrieval request; and
combine search results of the multiple retrieval requests to obtain the search result of the search keyword.

9. The apparatus according to claim 8, wherein the instructions are executed by the at least one processor to enable the at least one processor to:
add multiple different preset fields respectively to the search keyword to obtain the multiple retrieval requests.

10. The apparatus according to claim 9, wherein the instructions are executed by the at least one processor to enable the at least one processor to:
combine the search results calculated from the respective queues according to priorities of the multiple queues corresponding to the multiple retrieval requests.

11. The apparatus according to claim 8, wherein the instructions are executed by the at least one processor to enable the at least one processor to:
modify a field of the search keyword for multiple times according to a preset modification rule to obtain the multiple retrieval requests.

12. The apparatus according to claim 8, wherein multiple queues corresponding to the multiple retrieval requests are distributed in a tree structure.

13. The apparatus according to claim 12, wherein the instructions are executed by the at least one processor to enable the at least one processor to:
combine the search results obtained through calculation from the respective queues layer-wise according to a sequence of the tree structure.

14. The apparatus according to claim 8, wherein the instructions are executed by the at least one processor to enable the at least one processor to:
combine the search results calculated from the respective queues according to priorities of the multiple queues corresponding to the multiple retrieval requests.

15. The apparatus according to claim 8, wherein the instructions are executed by the at least one processor to enable the at least one processor to:
adjust at least one of a font in the search result and a dimension of an image in the search result with use of the business layer of the vertical search architecture to obtain the target search result.

16. A non-transitory computer readable storage medium stored with computer instructions for enabling a computer to execute the method according to claim 1.

* * * * *